May 13, 1941.  R. S. TAYLOR  2,241,680
SPEED CHANGE GEARING
Filed Nov. 5, 1938   4 Sheets-Sheet 4
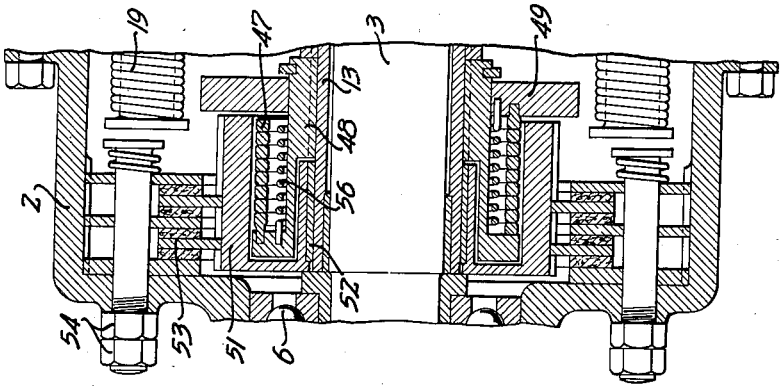
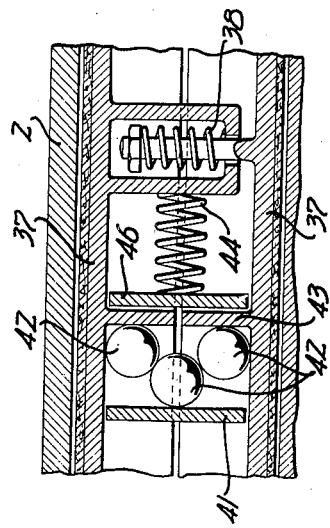
INVENTOR
ROBERT S. TAYLOR
BY
HIS ATTORNEY Patented May 13, 1941

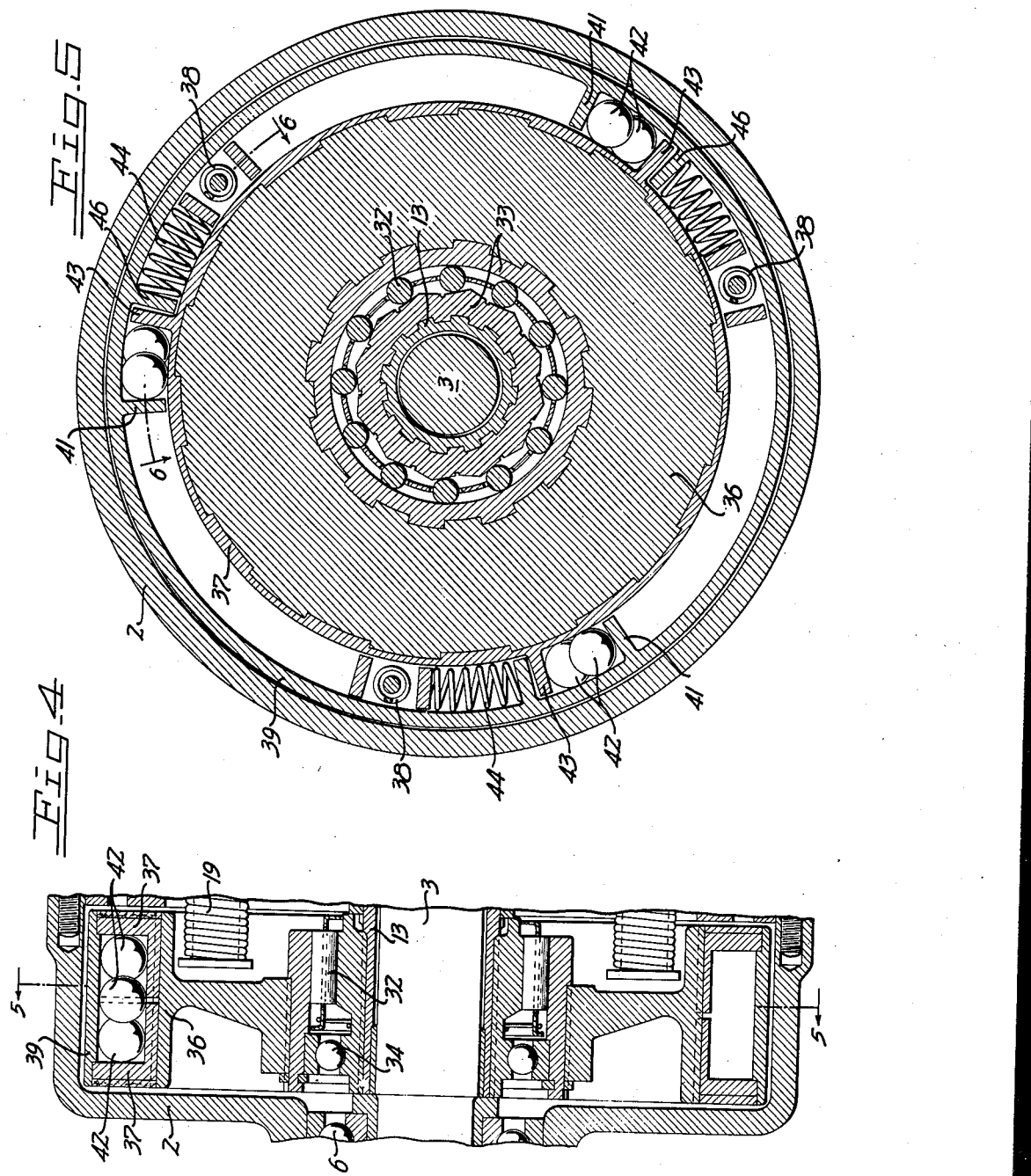

2,241,680

UNITED STATES PATENT OFFICE 2,241,680

SPEED CHANGE GEARING

Robert S. Taylor, Seattle, Wash.

Application November 5, 1938, Serial No. 239,057

16 Claims. (Cl. 74—290)

My invention relates to a speed change system for automobiles; and more particularly to an automatic transmission unit, such as an overdrive.

It is among the objects of my invention to provide a speed change system that changes smoothly from one speed to another, and operates to transmit a continuous driving torque to a driven shaft.

Another object is to provide a gear system of the character described in which the continuous transmission of driving thrust is preserved by means of a load applied to a part of the gear system during the period of shift, so that during such period the driving torque is balanced between the driven shaft and the loaded part.

A further object is to provide a planetary overdrive transmission having inertia means, such as a fly-wheel, connected to the sun gear for applying a load to the latter during the interval between release of the sun gear from overdrive and locking of the gears together in direct drive.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 4 is a fragmentary axial sectional view showing a modified construction embodying an inertia brake; and Figure 5 is a transverse sectional view of the same, taken in a plane indicated by line 5—5 of Figure 4; and Figure 6 is a sectional view of the inertia brake, taken in an arcuate plane indicated by line 6—6 of Figure 5.

Figure 7 is a fragmentary axial sectional view showing another modified construction embodying a disk brake and a helical spring clutch.

In a speed change gearing there is usually a momentary interruption in driving thrust to the driven shaft during the shift. This is particularly noticeable when the shift is from a higher to a lower gear, and is a problem in automatic overdrives when the shift is made from overdrive to direct. In order to overcome this problem, I put an independent load on a part of the gear system during the period of shift, so that the driving thrust is balanced between the load on the driven shaft and the independent load. By this arrangement the driving thrust to the driven shaft is not interrupted, and a transmission embodying my improvements shifts smoothly and quietly, without the feeling to a critical person in the car that the transmission has let go of the load and then picked it up again.

In terms of broad inclusion, the mechanism embodying my invention comprises drive and driven shafts; a speed change system connecting the shafts; and means for applying a load on a part of the system during its operation for balancing the torque of the drive shaft between the driven shaft and the loaded part. The load is preferably applied as an independent or additional load to a part of the system during the period of speed change, so that a continuous driving thrust is transmitted to the driven shaft during such speed change. The speed change system preferably comprises a planetary gearing with releasable means for holding the sun gear against rotation for planetary operation of the system; means for locking the gears together for rotation as a unit upon release of the sun gear, and means for applying an independent load on a gear of the system so as to retard acceleration of the latter during the interval between release thereof and the locking of the gears together. The independent load is preferably supplied by inertia means, such as a fly-wheel and is preferably connected with a gear, such as the sun gear, during the period of shift.

Figure 1:
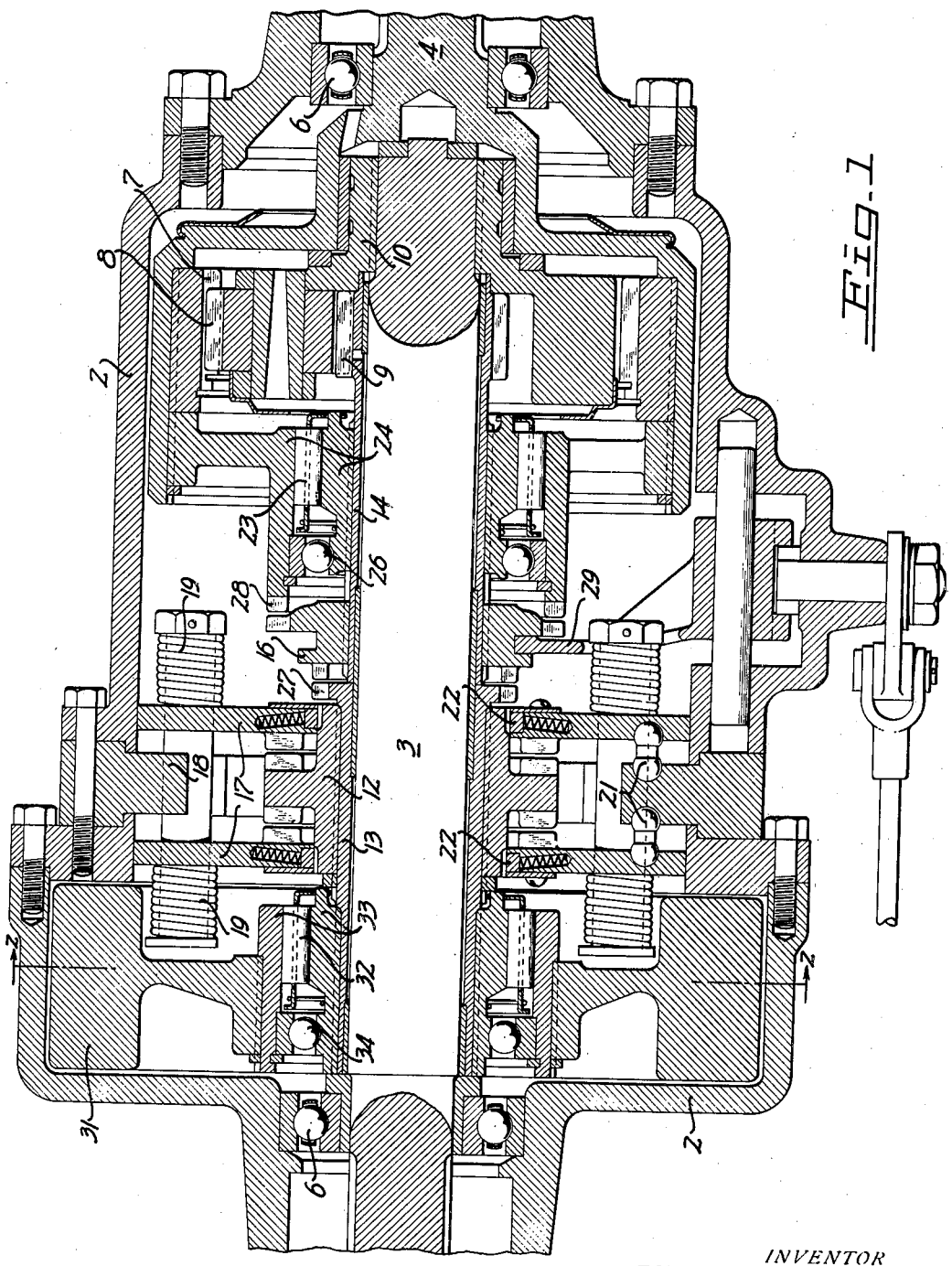
Figure 1 is an axial sectional view of an overdrive transmission embodying the speed change gearing of my invention.
Figure 2:
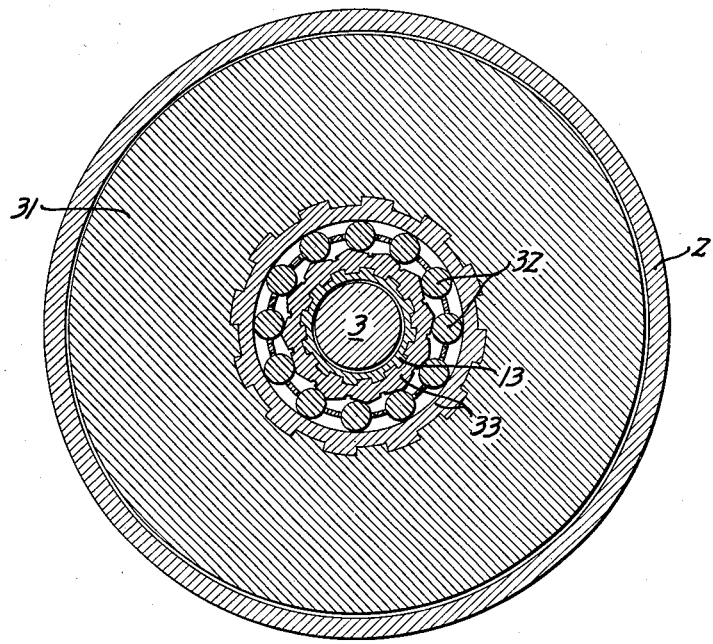
Figure 2 is a transverse sectional view of the same showing the fly-wheel mounting, taken in a plane indicated by line 2—2 of Figure 1.
Figure 3:
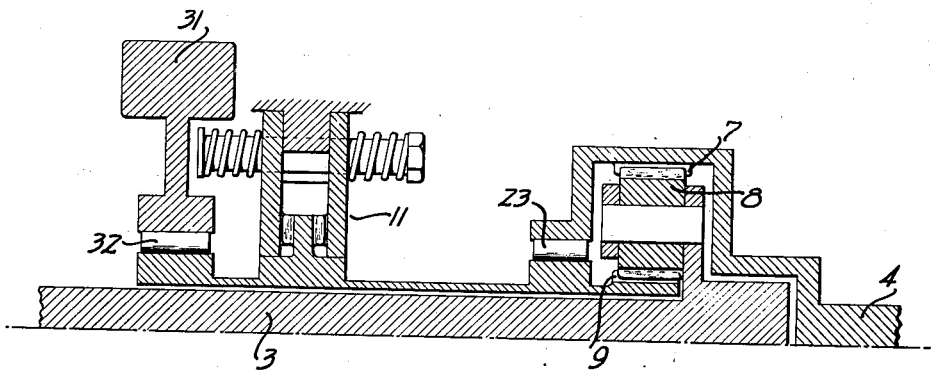
Figure 3 is a diagrammatic sectional view showing the principal elements of the gearing.

In greater detail, and referring to Figures 1 to 3 of the drawings, the improvements embodying my invention are shown in conjunction with an overdrive transmission relying upon torque to shift from overdrive to direct drive, such as described in my copending application, Serial No. 177,902, filed December 3, 1937. Such a transmission comprises a suitable housing 2 having drive and driven shafts 3 and 4 journaled therein in bearings 6. The unit is adapted to be interposed as an auxiliary transmission in the propeller shaft of an automobile, either ahead or behind the ordinary speed change transmission.

A planetary gear system is arranged in the housing and comprises an orbit gear 7, planet gear 8 and sun gear 9. In the overdrive relationship illustrated the orbit gear 7 is connected with the driven shaft 4, and the planet gear 8 is connected with the drive shaft 3 by a suitable mounting 10, so that when gear 8 planetates about the stationary sun gear 9 the orbit gear 7 and connected driven shaft are rotated faster than the drive shaft.

Means are provided for holding the sun gear against rotation for plentary operation of the gear system to furnish the overdrive. For this purpose a torque controlled brake 11 is arranged to lock the sun gear to the housing; the brake being releasable to free the sun gear when the torque of the sun gear exceeds a predetermined value. The brake comprises a central element 12 splined on a sleeve 13 connected to sun gear sleeve 14 through a manually shiftable member 16. A pair of brake plates 17 are connected for limited rotation with a fixed element 18 of the housing, and are also movable laterally from the extended position shown in Figure 1 to a collapsed position engaged with brake element 12.

Springs 19 urge the brake plates toward collapsed position, and the extension and collapsing of the plates is controlled by toggle links 21 pivotally connected between the plates and fixed element 18. Ratchets 22 are also provided between the brake plates and brake element 12 to effect rotation of the plates to collapse the toggles and engage the brake when the sun gear tends to rotate backwards, as it does when the driven shaft tends to overrun the drive shaft. The brake then remains engaged to keep the transmission in overdrive until the torque of the sun gear in its forward direction of rotation is sufficient to extend the toggles and disengage the brake. The "forward" direction of rotation of the sun gear being the direction which it tends to rotate (clockwise as viewed from the left in Figure 1) when the drive shaft is applying thrust to the driven shaft; and the "backward" direction of rotation being that direction which it tends to rotate (counter-clockwise as viewed from the left in Figure 1) when the driven shaft tends to overrun the drive shaft. This brake structure and its operation is only referred to briefly herein, because it is described in detail in my above mentioned application.

Means are also provided for locking the gears of the planetary system together to connect the shafts for rotation as a unit when the sun gear is released by disengagement of the torque brake. For this purpose a one-way clutch 23 is preferably interposed between the sun and orbit gears, and comprises a pair of rings 24 retaining clutch rollers 23 and separated by a bearing 26; the outer ring being splined to the orbit gear rotor and the inner ring being splined to sun gear sleeve 14.

The one-way clutch operates to lock the gears together for rotation as a unit whenever the sun gear is free and the drive shaft tends to overrun the driven shaft, as occurs in direct drive. It is to be noted that the one-way clutch also cooperates with the torque brake in the overdrive relationship, because when sun gear 9 is held the orbit gear overruns the sun gear, which it is free to do by the one-way clutch. This is also described in detail in my copending application, above mentioned.

Means are also preferably provided for optionally locking the sun gear to the orbit gear, so that they are positively locked for unitary rotation. For this purpose clutch member 16 is slidably splined on sun gear sleeve 13, and is shiftable to engage either teeth 27 of the torque brake or teeth 28 on the orbit gear assembly. In the latter case the unit is locked in direct drive, and the torque brake is rendered inactive. Suitable shifting means, such as a yoke 29 connected with a lever in the driver's compartment is arranged to give the driver control of this optional shift.

Operation of the transmission thus far described is as follows: Consider that optionally shiftable clutch member 16 is at the left (Figure 1) to lock torque brake element 12 to the sun gear, and also consider that plates 17 of the torque brake are disengaged. Under these conditions the sun gear is free and the parts of the planetary system are locked together for direct drive through one-way clutch 23 as long as the drive shaft tends to overrun the driven shaft. However, when the driven shaft tends to overrun the drive shaft, the sun gear tends to rotate in the reverse direction. This causes plates 17 of the torque brake to rotate backwards through ratchets 22, thus collapsing toggles 21 to engage the brake and lock the sun gear to the housing. With the sun gear held against rotation the pinions 8 are forced to planetate to give the overdrive.

This overdrive connection will be maintained as long as torque brake 11 is engaged. It will be noted that the torque of the sun gear is transmitted to plates 17, tending to extend the toggles and disengage the brake. Considerable torque is necessary to disengage the brake, because the angle between the toggle links is relatively small, and a relatively great force is required to move them out against springs 19. The torque brake is designed to keep the car in overdrive until the torque of the sun gear exceeds a predetermined value, and the brake releasing torque is calculated to cut out the overdrive before the load on the motor becomes too great. Of course when the torque brake releases the sun gear the one-way clutch immediately locks the gears together for direct drive.

While the transmission thus far described is an entirely practical unit, I have found that the automatic shift from overdrive to direct drive is accompanied by a slight shock perceptible to a person critically observing the performance of the unit. This shock is due to the fact that when the light and practically inertialess sun gear is released it rapidly accelerates under the driving thrust of the motor to the speed of the orbit gear, prior to the time when one-way clutch 23 operates to lock the parts together for unitary rotation. During this period the effort of the motor is given almost entirely to speeding up the sun gear, because the resistance offered by the small sun gear is almost negligible compared to the resistance of the orbit gear which is driving the car. As a result the driving thrust to the driven shaft is momentarily interrupted until the gears have been locked for direct drive.

For example, if the engine is turning over at 1300 R. P. M. and the orbit gear is running at 1800 R. P. M. in the overdrive relationship, then when the torque brake lets go, the sun gear must jump from 0 to 1800 R. P. M. while the drive shaft is speeding up the 500 R. P. M. required to take it from 1300 to 1800 R. P. M. With a non-resisting sun gear, this jump in gear speed occurs in a very short period (about $\frac{1}{10}$ second), and is accompanied by a slight shock and the feeling to a person in the car that the transmission has let go of the load and then picked it up again.

My present invention relates particularly to means for removing this objection. I accomplish the desired result by applying an independent load on the sun gear, so that the thrust of the drive shaft is divided and balanced between the load on the driven shaft (car load) and the independent load on the sun gear during the period of shift. By this means the sun gear cannot immediately jump to its upper speed, but accelerates gradually (as the independent load is overcome) until it reaches the speed of the orbit gear. Thus the shock is overcome, and a portion of the driving thrust is always applied to the driven shaft. This is equivalent to providing a moving fulcrum for the driving power during the shift, and results in a quiet, smooth shifting action without interruption in the transfer of driving thrust from one shaft to another.

A simple form of my invention, as shown in Figures 1 and 2, comprises a fly-wheel 31 operatively connected with the sun gear to increase the inertia of the latter during the period of shift from overdrive to direct drive. The fly-wheel is preferably mounted in the housing on an extension of sleeve 13. A one-way clutch 32 is interposed between the fly-wheel and sleeve so that the sun gear picks up the load of the fly-wheel only in the forward direction of sun gear rotation. The fly-wheel therefore does not resist backward rotation of the sun gear at the time when torque brake element 12 is being turned back to engage the torque brake. One-way clutch 32 is preferably similar to clutch 23, and comprises rings 33 embracing the clutch rollers 32 and separated by a bearing 34; the inner ring being splined on sleeve 13 and the outer ring providing a carrier for the fly-wheel. I have found that a fly-wheel weight of about fourteen or fifteen pounds is correct for an overdrive transmission of the character described.

Figure 3 shows diagrammatically the principal elements of my improved transmission; the torque brake and fly-wheel being shown mounted directly on the sun gear sleeve for purposes of simplicity. In this view it will be seen that when torque brake 11 is released to free the sun gear, the power delivered to the planet gear from the drive shaft is going to turn either the orbit gear or sun gear, or both, in accordance with the relative resistance offered by these gears. If the sun gear has little inertia it naturally will yield rapidly to the driving thrust and accelerate quickly to the speed of the orbit gear, the latter receiving little or no driving thrust until the gears are locked up by one-way clutch 23.

With my improved construction however, the sun gear is loaded with fly-wheel 31 and the power delivered to planet gear 8 must overcome the inertia of this fly-wheel in bringing the sun gear up to the speed of the orbit gear. The inertia offered by fly-wheel 31 is considerable when the sun gear has to go from say 0 to 1800 R. P. M. in a short space of time. In fact, the driving power cannot immediately overcome this resistance, and a part of the thrust continues to drive the load (car load) on the driven shaft. Gradually the inertia of the independent load (fly-wheel) is overcome, and the sun gear accelerates smoothly until the gears are locked together. The independent load thus provides means for retarding acceleration of the sun gear during the interval between release of the sun gear and the locking of the gears together.

Another way of applying an independent load on the sun gear is to utilize an inertia brake, such as shown in Figures 4 to 6. The brake in this case takes the place of the fly-wheel, and comprises a rotor 36 on the outer ring of one-way clutch 32 and carrying a pair of annular brake shoes 37 slidably splined for lateral movement against the walls of the housing. The brake shoes are moved out against retracting springs 38 by inertia means comprising a floating rim 39 embracing the shoes and having a flange 41 engaging one of three spreader balls 42 lying between the shoes and retained by flanges 43 on the latter.

As rotor 36 speeds up with the sun gear, rim 39 lags behind and presses on balls 42 which force brake shoes 37 outwardly against the walls of the housing, thereby retarding acceleration of the sun gear. As soon as the sun gear has passed the period of rapid acceleration (after the gears are locked together), there is no material tendency of rim 39 to lag behind the brake rotor, and the outward thrust on the brake shoes is released to allow the latter to be disengaged by springs 38. The brake is therefore effective only during the period of shift, and does not act as a load during the normal operation of the transmission.

Springs 44 are also preferably provided between the rotor and flanges 46 of rim 39 to resist lagging of the rim during the normal and lesser accelerations that occur after the transmission is in direct drive. This is to prevent application of the brake at any time other than during the period of shift.

Still another modification of my invention is shown in Figure 7, wherein the roller type one-way clutch at the independent load is replaced by a helical spring clutch 47. The latter is fastened at one end to a rotor 48 on sleeve 13 and at the other end is engaged by a small fly-wheel 49 journaled on the rotor. This fly-wheel lags behind rotor 48 during rapid acceleration of the sun gear and unwraps or expands clutch spring 47 into engagement with a cup 51 journaled coaxially with the spring on a bearing 52.

Suitable means, such as an ordinary disk brake 53, may be provided for resisting rotation of cup 51 and thereby retard acceleration of the sun gear. Disk brake 53 is preferably adjustable, as by nuts 54, to alter the braking force. After the period of rapid acceleration of the sun gear is over, fly-wheel 49 ceases to lag and clutch spring 47 wraps itself up and out of engagement with cup 51. A coil spring 56 is also preferably provided between rotor 48 and fly-wheel 49 to return the fly-wheel to its normal position and to resist lagging of the fly-wheel during normal accelerations. In this structure the independent load imposed by the brake is also effective only during the period of shift, and does not provide a drag on the mechanism during normal operation of the transmission. The helical clutch of course does not engage during backward rotation of the sun gear, and its one-way operation therefore deos not interfere with the engaging action of the torque clutch.

In the various modifications of my invention the broad combination of elements is the same; namely, a gear (planetary) system connecting the shafts and operable to shift from one speed to another, and means for applying an independent load on one of the gears (sun gear) during the period of shift, whereby acceleration of the latter gear is retarded and the driving thrust of the drive shaft is divided between the load on the driven shaft and the independent load during the shift.

I claim:

1. In a planetary gear system having orbit, planet and sun gears, releasable means for holding one of said gears against rotation for planetary operation of said system, torque controlled means for operating said releasable holding means, and means for retarding acceleration of the held gear after the holding means is released.

2. A speed change gearing comprising drive and driven shafts, a planetary gear system including orbit, planet and sun gears operatively connected to the shafts for planetary operation when the sun gear is held against rotation, releasable means for holding the sun gear, torque controlled means for operating said releasable holding means, means for locking the gears together for rotation as a unit upon release of the sun gear, and means for applying a load on the sun gear during the interval between its release and the locking of said gears together.

3. A speed change gearing comprising drive and driven shafts, a planetary gear system including orbit, planet and sun gears operatively connected to the shafts for planetary operation when the sun gear is held against rotation, releasable means for holding the sun gear, a one-way clutch for locking the gears together for rotation as a unit upon release of the sun gear, and means for applying a load on the sun gear during the interval between its release and the locking of said gears together.

4. A speed change gearing comprising drive and driven shafts, a planetary gear system including orbit, planet and sun gears operatively connected to the shafts for planetary operation when the sun gear is held against rotation, releasable means for holding the sun gear, means for locking the gears together for rotation as a unit upon release of the sun gear, means for applying a load on the sun gear during the interval between its release and the locking of said gears together, and means for disconnecting said load after the gears are locked together.

5. In a planetary gear system having orbit, planet and sun gears, releasable means for holding one of said gears against rotation for planetary operation of said system, means for retarding acceleration of the held gear after the holding means is released, and a one-way clutch interposed between the held gear and said retarding means.

6. In a planetary gear system having orbit, planet and sun gears, releasable means for holding one of said gears against rotation for planetary operation of said system, means for retarding acceleration of the held gear after the holding means is released, and an inertia operated clutch for connecting the latter gear to said retarding means during acceleration of the gear and for disconnecting the gear from the retarding means after said acceleration.

7. In a planetary gear system having orbit, planet and sun gears, releasable means for holding one of said gears against rotation for planetary operation of said system, means for retarding acceleration of the held gear after the holding means is released, and a helical spring clutch for connecting the latter gear to said retarding means during acceleration of the gear and for disconnecting the gear from the retarding means after said acceleration.

8. In a planetary gear system, releasable means for holding a part of the system against rotation, a one-way clutch engageable to connect parts of the system together upon release of said holding means, and means for absorbing torque of said first part during the interval between release of said holding means and engagement of said clutch.

9. In a planetary gear system having a sun gear, releasable means for holding the sun gear against rotation, a one-way clutch engageable to lock the sun gear to another part of said system upon release of said holding means, and means for absorbing torque of the sun gear during the interval between release of the holding means and engagement of said clutch.

10. A speed change gearing comprising drive and driven shafts, a planetary gear system interposed between the shafts and having a sun gear, releasable means for holding the sun gear against rotation to establish an overdrive connection between the shafts, a one-way clutch engageable to connect the sun gear to another part of the system to establish a direct drive connection between the shafts upon release of said holding means, and means for absorbing torque of the sun gear during the interval between release of said holding means and engagement of the clutch to reduce the shock of said clutch engagement when the direct drive connection is established between said shafts.

11. In a gear system, a one-way clutch engageable to establish a driving connection between parts of said system, said clutch having an element connected for rotation with a part of the system and adapted to be accelerated thereby, and means for retarding acceleration of said element of the clutch prior to engagement thereof to reduce the shock of said engagement.

12. In a gear system, a one-way clutch engageable to establish a driving connection between parts of said system, said clutch having an element connected for rotation with a part of the system and adapted to be accelerated thereby, and a fly-wheel connected with said element of the clutch for retarding acceleration thereof prior to engagement of the clutch to reduce the shock of said engagement.

13. A speed change system comprising means for establishing different speed ratios, means including a clutch operatively connected with said system for changing from one speed ratio to another, and means for absorbing torque of a part of said system during said speed change to reduce the shock of clutch engagement.

14. A speed change system comprising means for establishing different speed ratios, means including a clutch for changing from one speed ratio to another, and means for absorbing torque of a part of said system during said speed change to reduce the shock of clutch engagement.

15. In a planetary gear system, releasable means for holding a part of the system against rotation, a fly-wheel connected to said part for absorbing its torque upon release of said holding means, and a one-way clutch interposed between the fly-wheel and said part.

16. In combination, drive and driven shafts, a gear system for establishing a predetermined speed ratio between the shafts, a clutch engageable to establish a different speed ratio between the shafts, and means for applying a load to a part of the system prior to engagement of the clutch, whereby the torque of the drive shaft is divided between the driven shaft and said loaded part to reduce the shock of clutch engagement.

ROBERT S. TAYLOR.